D. BOSQUI.
METHOD AND APPARATUS FOR THE PRECIPITATION OF GOLD AND SILVER FROM CYANID SOLUTIONS.
APPLICATION FILED FEB. 21, 1911.
1,018,604.
Patented Feb. 27, 1912.
2 SHEETS—SHEET 2.
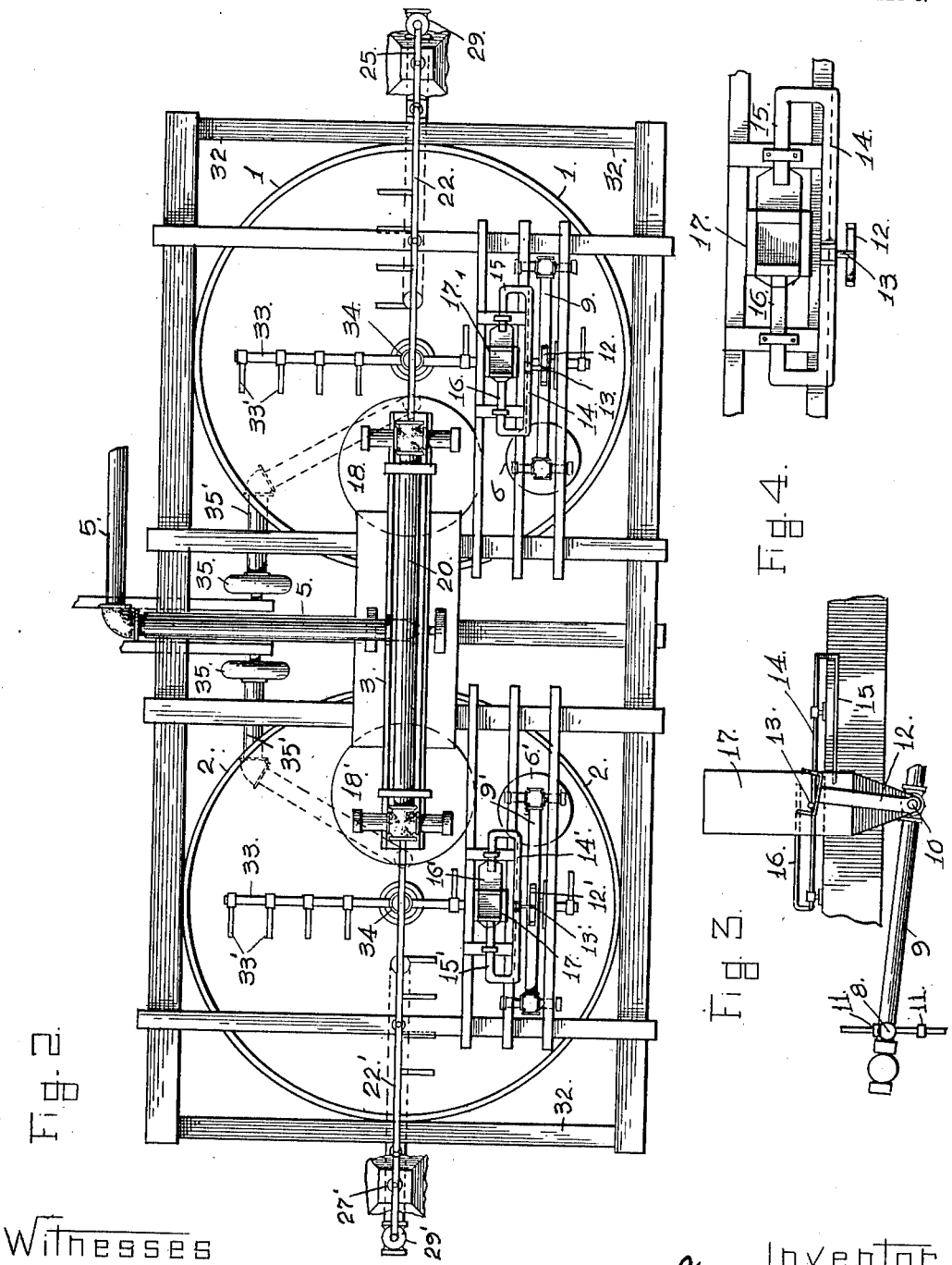

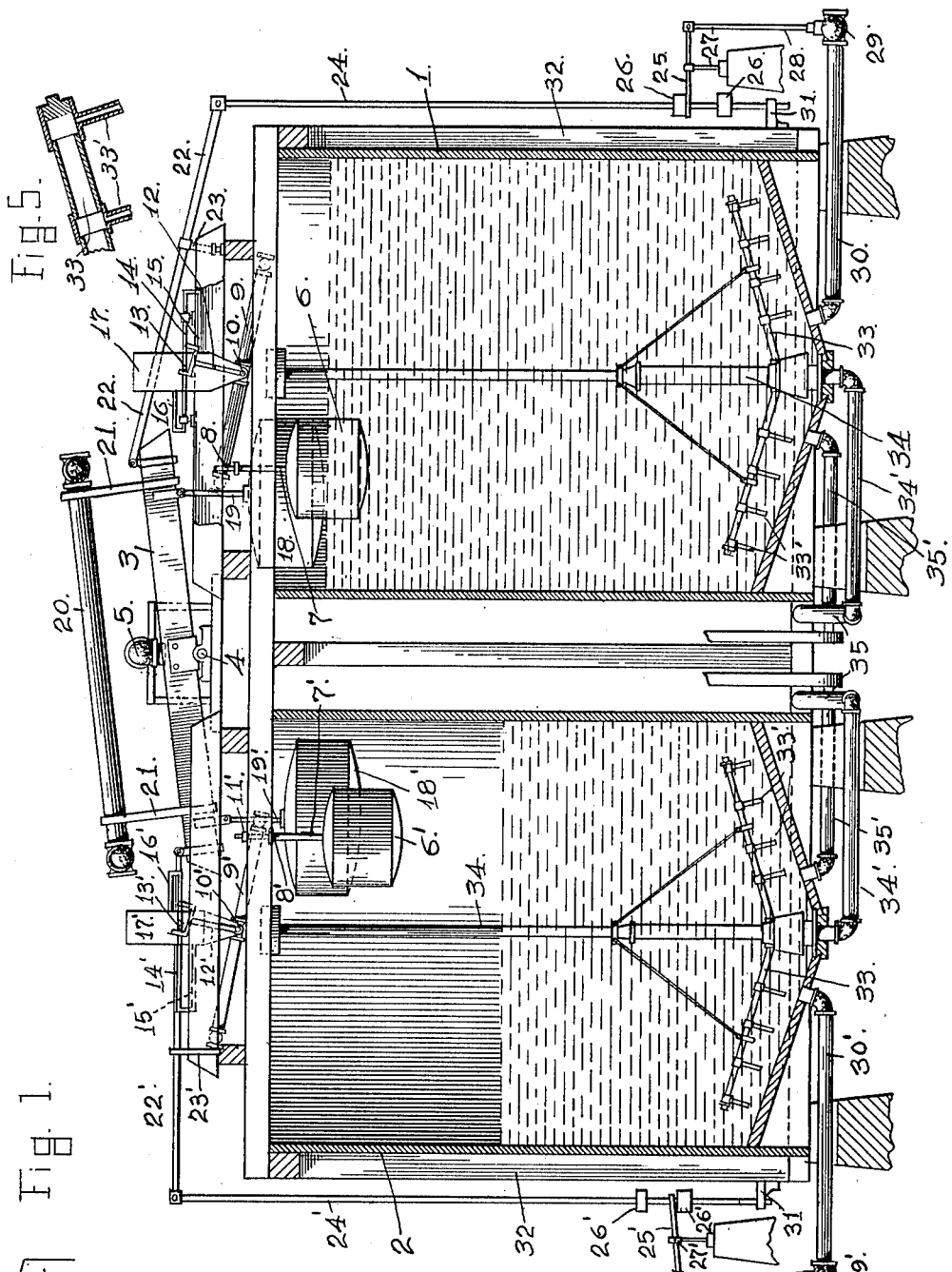

UNITED STATES PATENT OFFICE.

DANIEL BOSQUI, OF GOLD ROAD, ARIZONA TERRITORY, ASSIGNOR, BY MESNE ASSIGNMENTS, TO MERRILL METALLURGICAL COMPANY, OF SAN FRANCISCO, CALIFORNIA, A CORPORATION OF CALIFORNIA.

METHOD AND APPARATUS FOR THE PRECIPITATION OF GOLD AND SILVER FROM CYANID SOLUTIONS.

1,018,604.      Specification of Letters Patent.      Patented Feb. 27, 1912.

Application filed February 21, 1911. Serial No. 610,008.

*To all whom it may concern:*

Be it known that I, DANIEL BOSQUI, a citizen of the United States, residing at Gold Road, in the county of Mohave and Territory of Arizona, have invented certain new and useful Improvements in Methods and Apparatus for the Precipitation of Gold and Silver from Cyanid Solutions, of which the following is a specification.

The hereinafter described invention relates to an improved apparatus for the precipitation of the gold and silver from cyanid solutions, the object of the invention being to accurately proportion the supply of zinc dust to the charge of solution to be treated, or in other words, deliver to a given quantity of cyanid solution a definite amount of zinc dust and to so deliver the same to the solution as to secure the exact time of contact desired, before the solution with its precipitated values and excess zinc are delivered to the filtering medium.

The apparatus comprises preferably two receiving tanks for the cyanid solution in which the precipitation of the gold and silver from the cyanid solution takes place, with means for alternately diverting the supply of the solution from one tank to the other, feed means for delivering a predetermined quantity of zinc dust to each of the receiving tanks, devices controlling the said means for alternating the feed of the zinc dust in accordance with the diversion of the cyanid solution from one tank to the other, means for maintaining the solution in an agitated condition throughout the operation of precipitation, and automatically controlled mechanism for cutting off the flow of solution in either of the tanks and regulating the outflow of the solution therefrom.

To comprehend the invention, reference should be had to the accompanying sheets of drawings, wherein—

Figure 1 is a side elevation of the improved apparatus with the receiving tanks in vertical section, one of said tanks being illustrated filled with liquid and its outlet valve opened for the discharge of liquid, the companion tank is being filled with liquid and its outlet valve closed. Fig. 2 is a top plan view of the mechanism disclosed by Fig. 1 of the drawings. Fig. 3 is a side elevation of the zinc dust receptacle or box, illustrating the slide arm carrying the cutter blades and the tilting lever for actuating the said slide arm. Fig. 4 is a detail plan view of the zinc dust receptacle and the slide arm carrying the cutter blades movable within the zinc dust receptacle and controlling the discharge therefrom. Fig. 5 is a fragmentary sectional view of one of the arms of the rotary agitator which is positioned in each of the receiving tanks.

The mechanism for controlling the flow of the cyanid solution and cutting off the supply thereof, regulating the feed of the zinc dust, and governing the discharge of the solution is identical in connection with each of the receiving tanks, likewise, the means employed for maintaining the solution under treatment in an agitated condition.

The numerals 1 and 2 are employed to designate the receiving tanks within which the cyanid solution to be treated is alternately delivered, the cyanid solution being delivered to the said tanks respectively by means of a tilting launder 3, supported at its center on the journals 4, which launder receives the solution to be treated from the feed pipe 5. Referring now more particularly to tank 1, as the solution delivered therein by the launder 3 approaches the filling point thereof, predetermined by the length of contact required for the zinc dust to be supplied thereto, the solution acts against the float 6 suspended within said tank and raises the same, the stem 7 of which float works through a guide 8 clamped to the inner end of a tilting lever 9. This lever consists of a tubular rod or pipe, partly filled with quicksilver and supported centrally on the journal 10. To the stem 7 are secured above and below the guide 8 the collars 11, the lower one of which on the upward movement of the float 6 raises the inner end of the pivoted or tilting lever 9. Attached to said lever and projecting upwardly centrally therefrom is a forked arm 12, the free ends of which, depending on the upward and downward movement of the float 6, engage with a pin 13 projecting laterally from a horizontally slidable arm 14 and move the same inwardly and outwardly. This slide arm carries the cutter blades 15 and 16, which move within the zinc feed box or receptacle 17 from opposite sides, working within milled grooves in said box. The cutter blades are separated or spaced apart and the inner end of the blade 16 overlaps the inner end of the blade 15 for a slight distance, about one-half an inch, so that when the blade 16 makes its return stroke from within box 17, the same moving in unison with the blade 15 no zinc dust feeds out of the box.

As the inner end of the lever 9 is carried past the horizontal by the uprise of the float 6, the quicksilver contained therein flows to the opposite end of the tube lever 9 and the forked arm 12, attached to the said lever impinges on the pin or stud 13 and shifts the arm 14 to move the cutter 16 within the feed box 17 and the cutter 15 from within the same, allowing the zinc dust to drop from within the feed box into the solution contained within the tank 1, the amount or charge of the zinc dust depending on the inside measurements of the feed box 17 and the distance that the cutter blades 15 and 16 are spaced apart.

After the charge of zinc dust has been discharged within the tank 1, the cyanid solution continuing to rise therein actuates the float 18 and through the connection of its stem 19 with the launder 3, raises such end of the said tilting launder, and as the same is carried above the horizontal position, elevates such end of the pipe 20 containing quicksilver, which pipe is connected to the pivoted launder 3 at each end by the supports 21. During this movement of the tube 20 the quicksilver contained therein is shifted toward the lowered end thereof, while at the same time the inner end of the lever 22 is raised and the outer end thereof depressed, the said lever being fulcrumed to the swinging link 23, which allows for the arc made by the launder during its tilting movement. As the inner end of the lever 22 is raised or elevated, its outer end is depressed, which being connected to the vertically movable rod 24 actuates the same to operate the valve controlling the outflow of the treated solution from within the tank 1. The lower end of the rod 24 works through the slotted lever 25, which is acted on by the collars 26 adjustably secured to said rod above and below the lever 25.

The lever 25 is fulcrumed at 27 and the outer end thereof is connected to a stem 28 projecting from the controlling valve 29 situated within the outlet pipe 30, consequently when the upper collar 26 acts against the inner end of the lever 25 on the downward movement thereof, the same is carried therewith and its outer end thrown upwardly, drawing therewith the stem 28 and raising or unseating the valve 29 to permit of the outflow of the treated liquid from within the tank 1 through the outlet pipe 30, permitting the solution after its contact with the zinc dust, to run to the usual filtering medium.

The zinc feeder having been operated by the float 6 and subsequently the float 18 having operated the tilting or swinging launder 3 and at the same time operated the valve 29 for allowing the escape of the treated solution from tank 1, the gold and silver bearing solution will now be flowing from the launder 3 into the tank 2, the outlet valve 29' of which is closed. The operation of the working parts of said tank controlling the shifting of the swinging or tilting launder 3, the feed of zinc dust into the solution flowing into the said tank and the operation of the outlet valve is the same as that just described in connection with tank 1, that is as the float 6' is acted on by the inflowing solution the same is raised and through its stem 7' working through a guide 8' clamped to a tilting lever 9' consisting of a tube partly filled with quicksilver, the feed of zinc dust is delivered to the solution flowing into the said tank 2. The lever 9' is supported centrally on the journal 10' and to the stem 7' above and below the guide 8' the collars 11' are secured.

To the lever 9' is secured a projecting forked arm 12', which acts against a pin or stud 13' projecting from the horizontally slidable arm 14', carrying the cutter blades 15' and 16' working through the zinc dust feed box or receptacle 17', the arrangement and working thereof being the same as the cutter blades 15 and 16. After the float 6' has raised its full distance, the continued rise of the solution raises the secondary float 18', the stem 19' of which is connected to the end of the launder 3 opposite to that at which the stem 19 is attached, the upward movement of the float 18' raising the depressed end of the launder 3 above the horizontal arm which carrying therewith the tube 20 shifts the quicksilver contained therein to the opposite end thereof, at the same time the movement of the launder raising the inner end of the lever 22, fulcrumed at 23' and depressing the outer end thereof, forcing downwardly the rod 24', which acts to depress the inner end of the lever 25' fulcrumed at 27' and raise the outer end thereof, lifting the stem 28′ to unseat the valve 29′ and permit the outflow of the treated solution through the outlet pipe 30′. On the rod 24, above and below the lever 25′ are secured the collars 26′, which act against the free end of the lever 25′ for raising and lowering the inner end thereof in accordance with the movement of the actuating rod 24′.

The lower end of each actuating rod 24 and 24′ works through a guide 31 secured to and projecting from the frame 32 of the apparatus, by the upper frame pieces of which the tilting members of the apparatus are supported.

It will be understood that as the actuating mechanism for one tank is thrown into operation by the filling of the same with cyanid solution to be treated, the treated cyanid solution contained in the companion tank is being withdrawn, and that as the raising of the floats in one tank shifts the position of the operating mechanism for one tank, the lowering of the floats in the companion tanks acts to place the operating mechanism in a reverse position to that assumed by the corresponding parts of the tank being filled with solution for treatment.

In each tank is located an agitator 33, each being carried by a vertical shaft 34. The tubular radial arms of the agitator are provided with depending inclined nipples or nozzles 33′, and each agitator is connected by a pipe 34′ to a centrifugal pump 35, which takes liquid from within the tank by means of a suction pipe 35′. The liquid thus drawn from the tank is forced by the centrifugal pump 35 back into the agitator 33 through the discharge pipe 34′, the pressure of the liquid thus forced into the agitators escapes through the nozzles 33′, causing the agitators to be rotated at a suitable speed. The disposition of the nozzles or nipples 33′ relative to the tubular radial arms of the agitators is such, that at each complete revolution of the agitators the discharge from the nozzles or nipples, which are arranged at an angle to the bottom of the tanks, sweeps the entire surface of the bottom of the tanks.

The jets of solution striking the bottom of the tank prevent any settlement of the precipitates. Through the agency of the agitators an agitation of the solution is maintained that brings the zinc dust particles and the pregnant solution into intimate contact, while the circular motion of the tubular arms gives a rotary movement to the solution, while the jets of discharge create an upward current of solution, all tending to produce perfect agitation and at the same time admitting no air into the solution. The only contact with air that possibly takes place is through the surface exposure of the solution which is a negligible quantity.

By the use of the described apparatus there is a positive feed of a pre-determined quantity of zinc dust to a given quantity of cyanid solution to be treated, the flow of the solution for a single charge and the zinc dust therefore being automatically controlled, a positive time contact for the zinc dust with the solution is provided before withdrawal to the filtering medium, and at the same time the solution is maintained in a continuous agitated condition during the entire operation of precipitation.

Having thus described the apparatus what is claimed as new and desired to be protected by Letters Patent is—

1. A precipitating apparatus, the same comprising a plurality of receiving vessels for the solution to be treated, mechanism for alternately charging said vessels with solution, automatically actuated devices for alternately supplying pre-determined charges of zinc dust to said vessels, and means automatically thrown into action for controlling the outflow of the treated solution from within said vessels.

2. A precipitating apparatus, the same comprising a plurality of receiving vessels each provided with a valved controlled outlet, mechanism for alternately charging said vessels with solution to be treated, devices for alternately supplying automatically to said vessels pre-determined charges of zinc dust, means within each vessel for maintaining the solution therein in an agitated condition, and devices thrown into action on the filling of a vessel for automatically releasing the valved controlled outlet thereof for the escape of the treated solution.

3. A precipitating apparatus, the same comprising a plurality of receiving vessels, each provided with a valved outlet, a plurality of floats within each vessel, a tilting launder for automatically delivering solution to said vessel, connection between one of the floats within the vessels for tilting the said launder as the vessel fills, an automatically operated zinc dust feeder for each vessel for delivering a predetermined charge of zinc dust to the solution charge therein, connection between said feeder and the secondary float within the tank for actuating the same on the solution reaching a given level within the tank, and means thrown into action on the shifting of the tilting launder for actuating the valved outlet of the filled vessel.

4. In an apparatus for the described purpose, the combination with a plurality of valved controlled receiving vessels, of mechanism for alternately supplying thereto charges of solution to be treated, and means thrown into action on the solution reaching a given level in each of said tanks for supplying a pre-determined charge of zinc dust thereto before its delivery to the filtering medium.

5. In an apparatus for the described purpose, the same comprising a plurality of receiving vessels, a supply feed for the solution to be treated, means for delivering a pre-determined charge of zinc dust to each of the receiving vessels, and devices acted on by the solution delivered within the vessels for first alternating the flow of the solution from one vessel to the other, and secondly operating the zinc dust feed means to supply a charge of zinc dust to said solution.

6. In an apparatus for the described purpose, the same comprising a plurality of receiving vessels for the solution to be treated, a swinging launder for alternately delivering charges of the solution to the vessels, devices for supplying a pre-determined charge of zinc dust to each vessel during the filling operation thereof, and devices thrown into operation on the solution reaching a given level in the vessel being filled for shifting the position of the launder to supply liquid to the other vessel.

7. In an apparatus for the described purpose, the combination with a plurality of receiving vessels, automatically actuated mechanism for alternately supplying solution thereto for treatment, a zinc dust feed means for delivering a pre-determined charge of zinc dust to each vessel, and devices thrown into action on the solution in one vessel reaching a given level for operating the zinc dust feed means for the discharge of a given charge of zinc dust.

8. In an apparatus for the described purpose, the same comprising a plurality of receiving vessels for the solution to be treated, means for alternately diverting the delivery of the solution from one vessel to the other, feed means for alternately delivering a pre-determined quantity of zinc dust to each of the vessels before the charging thereof with solution, devices controlling the operation of the said zinc dust feed means in accordance with the diversion of the solution supply from one tank to the other, and devices thrown into action on the diversion of the solution from a filled vessel for regulating the discharge therefrom.

9. In an apparatus for the described purpose, the same comprising a plurality of receiving vessels for the solution to be treated, means for alternately diverting the delivery of the solution from one vessel to the other, feed means for alternately delivering a pre-determined quantity of zinc dust to each of the vessels before the charging thereof with solution, devices controlling the operation of the said zinc dust feed means in accordance with the diversion of the solution supply from one tank to the other, devices thrown into action on the diversion of the solution from a filled vessel for regulating the discharge therefrom, and means for maintaining the solution in an agitated condition throughout the operation of precipitation.

10. In an apparatus for the described purpose, the same comprising a plurality of receiving vessels, means for supplying a continuous flow of solution to the said vessels, feed means for delivering a pre-determined quantity of zinc dust to each of the receiving vessels before filling with solution, devices thrown into action on the solution in either vessel reaching a given level for alternating the feed of zinc dust, and automatically controlled mechanism for diverting the supply of solution from one vessel to the other and regulating the outflow of treated solution from the filled vessel.

11. In an apparatus for the described purpose, the combination with a plurality of receiving vessels for the continuous treatment of solution, each provided with a valved controlled outlet, a supply for the solution, a tilting launder for alternately distributing charges of the solution between the vessels, a float in each vessel for actuating the launder on the solution therein reaching a given level, a zinc dust box for each vessel, provided with cutter blades for delivering a predetermined quantity of zinc dust to each charge of solution, a swinging lever for each feed box connected with a horizontally movable arm for actuating the cutter blades, a secondary float in each receiving vessel for actuating the swinging lever on the solution reaching a given level in the vessel, and means thrown into action on the movement of the tilting launder for operating the valved outlet for the respective receiving vessels.

12. An apparatus for treating a continuous flow of cyanid solution for the precipitation of gold and silver therefrom, the same comprising a means for alternately diverting the flowing solution into independent receiving vessels as distinct charges, devices for alternately delivering to said charges a pre-determined charge of zinc dust in accordance with the diversion of the flowing solution from one vessel to the other, and devices for automatically controlling the discharge from said vessel, said devices acting to effect discharge of the treated material from one of said vessels as the other of said vessels is being filled.

13. In an apparatus for the described purpose, the combination with a plurality of receiving vessels, means for alternately supplying charges of cyanid solution thereto, devices for alternately delivering distinct and pre-determined charges of zinc dust to said vessels during the filling thereof with solution, and before its discharge to the filtering medium, and means controlling the outflow of the treated solution from the respective vessels.

In testimony whereof I have signed my name to this specification in the presence of two subscribing witnesses.

DANIEL BOSQUI.

Witnesses:
 ED. MAAG,
 F. H. PEYTON.

Copies of this patent may be obtained for five cents each, by addressing the "Commissioner of Patents, Washington, D. C."